United States Patent
Ochiai (10) Patent No.: US 9,248,678 B2
(45) Date of Patent: Feb. 2, 2016

(54) INFORMATION PROCESSING APPARATUS, AND METHOD FOR CONTROLLING IMAGE FORMING APPARATUS

(75) Inventor: Takashi Ochiai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 528 days.

(21) Appl. No.: 13/102,315

(22) Filed: May 6, 2011

(65) Prior Publication Data

US 2011/0298850 A1 Dec. 8, 2011

(30) Foreign Application Priority Data

Jun. 8, 2010 (JP) .................................. 2010-131504

(51) Int. Cl.
- *B41J 2/15* (2006.01)
- *B41J 29/38* (2006.01)
- *G06K 15/10* (2006.01)

(52) U.S. Cl.
CPC ............... *B41J 29/38* (2013.01); *G06K 15/107* (2013.01)

(58) Field of Classification Search
USPC .................. 347/14, 15, 41, 5, 9, 40; 358/1.15
See application file for complete search history.

(56) References Cited

U.S. PATENT DOCUMENTS

| 6,874,864 B1 * | 4/2005 | Maeda et al. ................... 347/41 |
| 7,661,786 B2 | 2/2010 | Nakazawa et al. |
| 2005/0219294 A1 | 10/2005 | Nakazawa et al. |
| 2009/0231617 A1 * | 9/2009 | Imai ............................. 358/1.15 |

FOREIGN PATENT DOCUMENTS

| JP | 2005-297212 A | 10/2005 |
| JP | 2008162096 A | 7/2008 |

OTHER PUBLICATIONS

Japanese Office Action issued in counterpart application No. 2010-131504 dated Feb. 7, 2014, along with its English-language translation—8 pages.

* cited by examiner

Primary Examiner — Lam Nguyen
(74) Attorney, Agent, or Firm — Fitzpatrick, Cella, Harper & Scinto (57) ABSTRACT

In order to control smoothness depending on accumulation of a pigment ink in the multi-pass printing, an information processing apparatus for an image forming apparatus that forms an image on the same area in a print medium by a plurality of printing scans with the same pigment ink, the information processing apparatus comprises an input unit that receives inputs of image data and a target gloss level; a storage unit that stores a plurality of pattern sets including a recording pattern for each of the printing scans; and a generation unit that generates pattern data corresponding to the recording patterns by selectively using the pattern sets based on the image data and the target gloss level; wherein at least one of the plurality of pattern sets has a different thinning ratio in the recording pattern for each of the printing scans on the same area.

6 Claims, 8 Drawing Sheets

INFORMATION PROCESSING APPARATUS, AND METHOD FOR CONTROLLING IMAGE FORMING APPARATUS

BACKGROUND OF THE INVENTION

1. Field of the Invention

The present invention relates to gloss control when an image is formed on a print medium.

2. Description of the Related Art

Inkjet printing apparatuses are classified into a serial-type inkjet printing apparatus in which a printhead scans the printing area in vertical and horizontal directions and a line-head type inkjet printing apparatus where nozzles extend on the full width of the printing area, and scanning is performed in only one direction. The serial-type inkjet printing apparatus, which is low cost, is being widely used. With the serial-type inkjet printing apparatus, images are sequentially formed on a print medium by, while ink is ejected from the printhead, alternately repeating printing main-scanning in which a carriage including a printhead is moved/scanned on the print medium and sub-scanning in which the print medium is conveyed by a predetermined amount in a direction perpendicular to the direction in which printing main-scanning is performed. The serial-type inkjet printing apparatus generally employs a printing method called multi-pass printing in which an image is formed in stages by performing a plurality of printing scans on the same image area of the print medium.

Also, demand for improved weather resistance and water resistance of printed matter is increasing in recent years, and pigment ink containing, as a color material, a pigment having superior weather resistance and water resistance is being developed. Unlike dyes that are present in the form of molecules, pigment ink is present in solvents in the form of particles having a size of several ten nanometers to several micrometers. It is generally known that in pigment ink, the size of color material is larger than that of dye ink, and it is therefore possible to obtain printed matter having a high weather resistance. In addition, the pigment particles are not soluble in water, and thus pigment ink is superior to dye ink in terms of water resistance as well.

However, when printing is performed using pigment ink, the pigment particles hardly permeate into the print medium and thus accumulate on the print medium surface. Accordingly, a phenomenon occurs in which the fine regularity (smoothness) of the image surface differs between a printed area and a non-printed area. Also, the amount of color material used differs depending on the density and color of the print image to be reproduced on the print medium, and therefore the amount of area covered by the color material in the print medium differs. Because the reflectivity of the color material and that of the print medium are different, as a result, the difference in the amount of area covered by the color material in the print medium will be recognized by the user as a difference in gloss. In other words, when printing is performed using pigment ink, the gloss level will differ depending on the density and color of the print image to be reproduced. Consequently, so-called "gloss non-uniformity" will occur in which areas having different gloss levels are formed in the same print image. Particularly when non-uniform gloss occurs in photographic printed matter, it is often recognized as an image flaw.

To address this, Japanese Patent Laid-Open No. 2005-297212 (Patent Document 1) discloses a technique in which the number of passes and the mask pattern for multi-pass printing are changed according to the gloss level of the print medium. Specifically, this technique performs multi-pass printing by changing the number of passes, the mask pattern and the concentration of pixels, in order to control the smoothness of the print medium surface depending on accumulation of the pigment ink.

It was found, however, when the technique of Patent Document 1 is applied to multi-pass printing in which the amount of ink per pass is small, it may not be possible to sufficiently control the smoothness of the print medium surface depending on accumulation of the pigment ink.

According to the present invention, even in multi-pass printing, the smoothness of the print medium surface depending on accumulation of the pigment ink is suitably controlled.

SUMMARY OF THE INVENTION

According to one aspect of the present invention, an information processing apparatus for an image forming apparatus that forms an image on the same area in a print medium by a plurality of printing scans with the same pigment ink, the information processing apparatus comprises: an input unit that receives inputs of image data and a target gloss level; a storage unit that stores a plurality of pattern sets including a recording pattern for each of the printing scans; and a generation unit that generates pattern data corresponding to the recording patterns by selectively using the pattern sets based on the image data and the target gloss level; wherein at least one of the plurality of pattern sets has a different thinning ratio in the recording pattern for each of the printing scans on the same area.

According to another aspect of the present invention, a method for controlling an image forming apparatus that forms an image on the same area in a print medium by a plurality of printing scans with the same pigment ink, the method comprises the steps of: receiving inputs of image data and a target gloss level; storing a plurality of pattern sets including a recording pattern for each of the printing scans; and generating pattern data corresponding to the recording patterns by selectively using the pattern sets based on the image data and the target gloss level; wherein at least one of the plurality of pattern sets has a different thinning ratio in the recording pattern for each of the printing scans on the same area.

According to the present invention, even in multi-pass printing, the smoothness of the print medium surface depending on accumulation of the pigment ink can be suitably controlled.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Hereinafter, preferred embodiments of the present invention will be described with reference to the drawings. It should be noted that the embodiments given below are merely exemplary and are not intended to limit the scope of the present invention.

First Embodiment

An image forming apparatus according to a first embodiment of the present invention will be described below taking an inkjet printing apparatus that performs multi-pass printing as an example.

Outline

The present inventors have found that the smoothness of the print medium surface changes when an image is formed using a pigment ink by changing the distribution of recording rate (thinning ratio) for each pass in multi-pass printing. Based on this finding, in the present embodiment, the smoothness depending on accumulation of the pigment ink in multi-pass printing is controlled by controlling the distribution of printing ratio for each pass in the multi-pass printing, whereby the smoothness can be controlled more suitably in multi-pass printing as compared to the technique disclosed in Patent Document 1 (in which the printing ratio among passes is constant).

Apparatus Configuration

Figure 1:
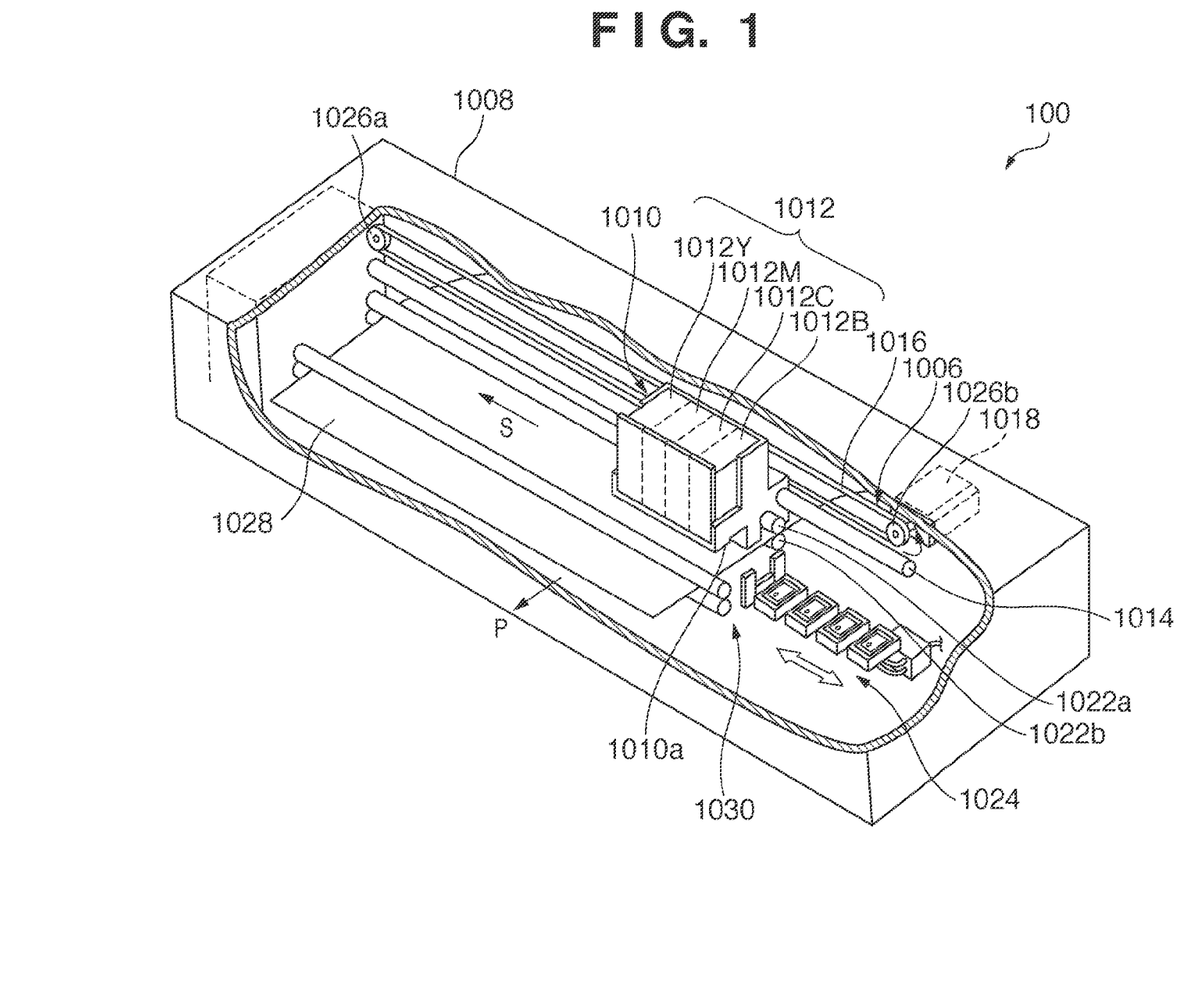
FIG. 1 is a schematic perspective view of an inkjet printing apparatus according to a first embodiment.

FIG. 1 is a schematic perspective view of an inkjet printing apparatus 100 according to the first embodiment. The inkjet printing apparatus 100 is disposed within a casing 1008 along the lengthwise direction thereof, and includes a conveying device 1030 that intermittently conveys a sheet 1028 as a print medium in the direction indicated by the arrow P. The inkjet printing apparatus 100 also includes a print unit 1010 that reciprocates along a guide axis 1014 substantially parallel to the direction indicated by the arrow S intersecting (substantially perpendicular to) the conveyance direction P of the sheet 1028, and an actuating unit 1006 serving as a driving unit that causes the print unit 1010 to reciprocate. The actuating unit 1006 includes pulleys 1026*a* and 1026*b* that are disposed on the axis of rotation and opposed and spaced apart by a predetermined spacing, a belt 1016 looped around the pulley 1026 and roller units 1022*a* and 1022*b*. The actuating unit 1006 also includes a motor 1018 that is disposed substantially parallel to the roller unit 1022*a* and that drives the belt 1016 connected to a carriage member 1010*a* of the print unit 1010 in the forward and reverse directions.

When the motor 1018 is activated and the belt 1016 rotates in the S direction, the carriage member 1010*a* of the print unit 1010 is moved in the S direction by a predetermined amount of movement. When, on the other hand, the motor 1018 is activated and the belt 1016 rotates in the direction opposite to the S direction, the carriage member 1010*a* of the print unit 1010 is moved in the direction opposite to the S direction by a predetermined amount of movement. Furthermore, at an end of the actuating unit 1006, a recovery unit 1024 for recovering ejection of ink by the print unit 1010 is disposed at the home position of the carriage member 1010*a* so as to correspond to the arrangement of ink outlet ports of the print unit 1010.

The print unit 1010 includes inkjet cartridges 1012Y, 1012M, 1012C and 1012B for printing four color inks. The cartridges respectively contain, for example, yellow, magenta, cyan and black inks and are detachably disposed in the carriage member 1010*a*. The ink contained in each cartridge is supplied to a printhead (not shown), and ejected from the printhead in accordance with image data. Here, a description will be given in the context of all of the inks contained in the cartridges being pigment inks, but it is only necessary that at least one color ink (black, for example) is a pigment ink.

Figure 2:
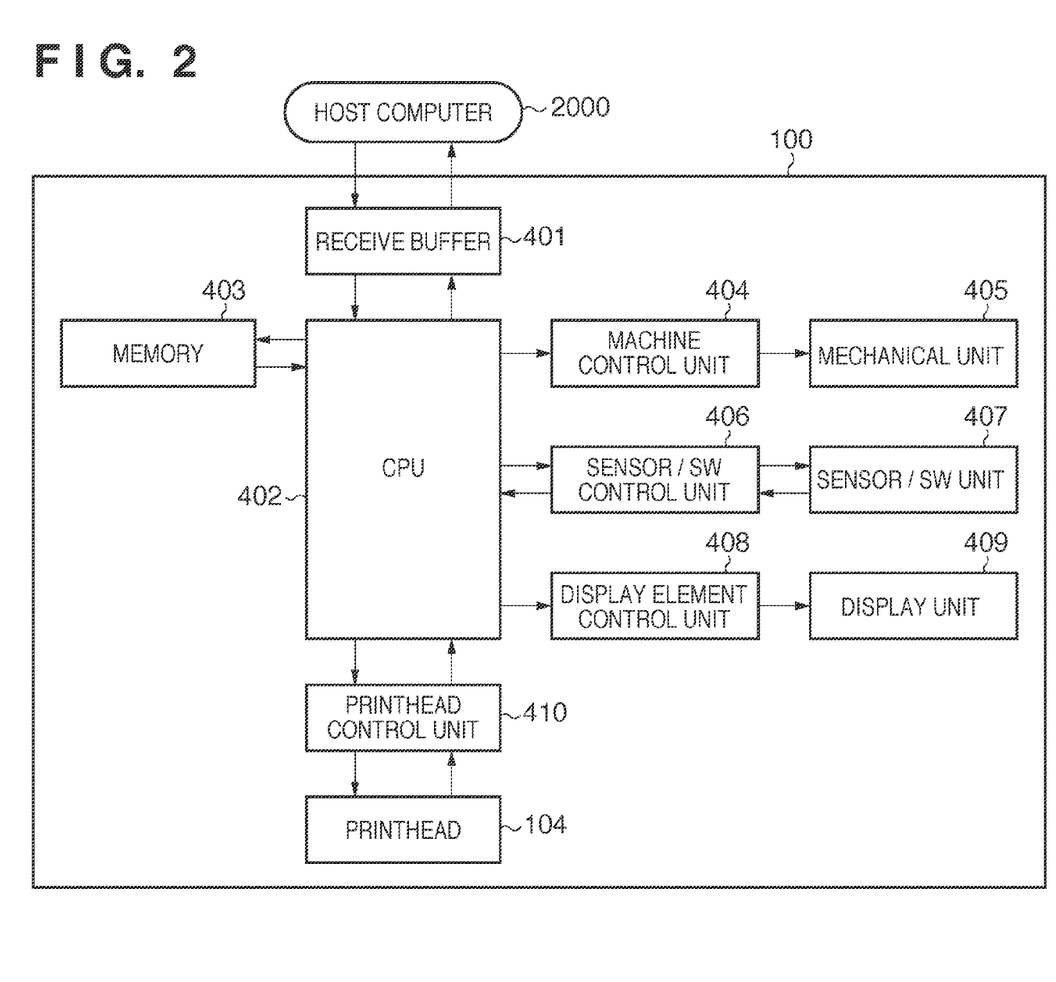
FIG. 2 is an internal block diagram of the inkjet printing apparatus according to the first embodiment.

FIG. 2 is an internal block diagram of the inkjet printing apparatus of the first embodiment. The inkjet printing apparatus 100 is connected to an external host computer 2000. Reference numeral 402 indicates a CPU, which controls various functions of the inkjet printing apparatus 100. Character data or image data from the host computer 2000 that needs to be printed is input via a receive buffer 401. On the other hand, a signal indicating whether or not data has been properly received and a signal indicating the operational state of the inkjet printing apparatus 100 are also transmitted to the host computer via the receive buffer 401. The data received by the receive buffer 401 is transferred to a memory 403 under control of the CPU 402, and temporarily stored in a RAM of the memory 403. In a ROM (or flash memory) of the memory 403, a control program for controlling printing operations, recovery operations and the like performed by the inkjet printing apparatus is stored. Furthermore, in the memory 403, pattern sets (mask pattern data) and gloss level information for each type of print medium, which will be described later, are also stored (storage unit, gloss level information storage unit).

A machine control unit 404 performs, in response to an instruction from the CPU 402, control to drive a mechanical unit 405 such as a carriage motor and a line field motor. A sensor/SW control unit 406 transfers signals from a sensor/SW unit 407 including various sensors and SWs (switches) to the CPU 402. A display element control unit 408 performs, in response to an instruction from the CPU 402, control of a display unit 409 composed of LEDs or liquid crystal display elements on a display panel group. A printhead control unit 410 controls a printhead 104 in response to an instruction from the CPU 402. The printhead control unit 410 also detects temperature information or the like that indicates the state of the printhead 104 and informs the CPU 402 of the detected state.

Figure 3:
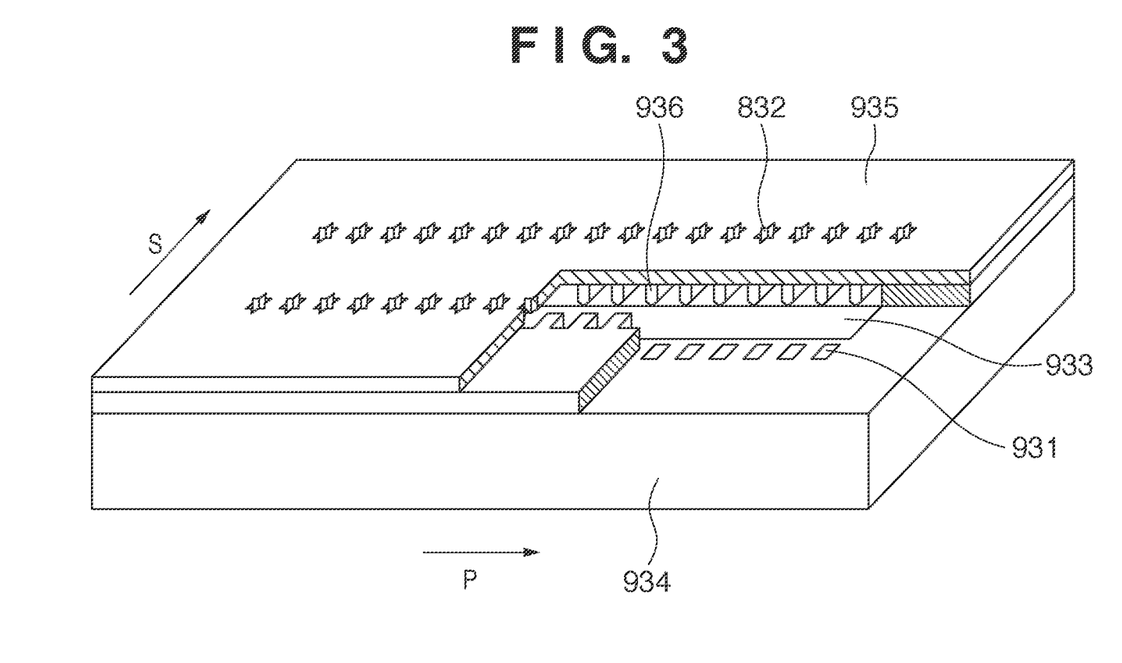
FIG. 3 is a schematic perspective view of a printhead (for one color) used in the inkjet printing apparatus.

FIG. 3 is a schematic perspective view of the printhead 104 used in the inkjet printing apparatus. In the diagram, only a printhead 104 for one color is illustrated. In the printhead 104, a substrate 934 made of glass, ceramic, plastic, metal or the like is used. However, the material of the substrate is not limited thereto as long as it can function as a part of a flow channel forming member as well as a support for material layers in which an ink ejection energy generating element and a liquid flow channel, which will be described later, and outlet ports are formed. Here, a configuration using an Si substrate (wafer) will be described. Ink outlet ports are formed in the substrate 934. As the method for forming the ink outlet ports, it is possible to use a method using laser light, or a method in which, for example, an orifice plate (outlet port plate) 935 made of a photosensitive resin is used, and ink outlet ports are formed using an exposure apparatus such as an MPA (Mirror Projection Aliner).

In FIG. 3, the substrate 934 is provided with electro-thermal converting elements (hereinafter also referred to as heaters) 931 and an ink supply inlet 933 including long groove-shaped through-openings as a common liquid chamber. The heaters 931 are arranged in lines on both sides in the lengthwise direction of the ink supply inlet 933 in a staggered manner at a pitch of, for example, 600 dpi in one line. The substrate 934 is also provided with ink flow channel walls 936 for forming ink flow channels. On the ink flow channel walls 936, an outlet port plate 935 including a plurality of outlet ports 832 (printing element array) disposed so as to correspond to the heaters is formed.

In FIG. 3, the ink flow channel walls 936 and the outlet port plate 935 are shown as separate members, but it is also possible to simultaneously form the ink flow channel walls 936 and the outlet port plate 935 as a single member by forming the ink flow channel walls 936 on the substrate 934 by means of, for example, spin coating or the like. The outlet port face (upper face) has been subjected to water repellent treatment.

The arrows S and P shown in FIG. 3 correspond to the arrows S and P shown in FIG. 1. An image is formed on a sheet 1028 as a print medium at a print density of 1200 dpi by, while ejecting an ink from the outlet ports, alternately repeating printing main-scanning in which the printhead is moved/scanned in the direction indicated by the arrow S and sub-scanning in which the print medium is conveyed in the direction indicated by the arrow P.

The inkjet printing apparatus 100 is capable of printing on a plurality of types of print media such as glossy paper which is fine paper having a glossy surface, and mat paper and regular paper which are non-glossy. The multi-pass printing described above can be applied to any of the print media, but the number of passes for multi-pass printing and the configuration of the pass mask used are changed depending on the type of print medium.

The multi-pass printing as used herein refers to a printing method in which an image is formed by causing a printhead including a printing element array composed of a plurality of printing elements arranged in the sub-scanning direction that is the conveyance direction of the print medium to perform scanning motion in the main-scanning direction that is the direction intersecting (substantially perpendicular to) the sub-scanning direction, and then sequentially conveying the print medium in the sub-scanning direction by a width smaller than the width of a band image that can be formed by the printing element array each time the printhead performs scanning motion.

Pigment Ink

The pigment ink used in the present embodiment includes a pigment in an amount of 1 to 20 wt %, and preferably 2 to 12 wt % based on the total weight of the pigment ink. The type of pigments that can be used in the present embodiment will be presented below.

As a black pigment, carbon black can be used. It is preferable to use carbon black produced by, for example, a furnace method or channel method and having properties such as a primary particle size of 15 to 40 mμ (nm), a BET specific surface area of 50 to 300 $m^2/g$, a DBP oil absorption of 40 to 150 ml/100 g, a volatilization rate of 0.5 to 10%, and a pH value of 2 to 9. It is also possible to use a self-dispersed pigment or the like.

As a dispersion of the pigment, any water soluble resin can be used. It is appropriate to use a water soluble resin having a weight average molecular weight of preferably 1,000 to 30,000, and more preferably 3,000 to 15,000. It should be noted that the amount of water soluble resin used as a pigment dispersion is preferably 0.1 to 5 wt % based on the total weight of the pigment ink, but the effects of the present invention can be exhibited significantly with a small amount based on the total weight of the pigment ink. Particularly, in the case of a pigment ink containing the above pigment, the entire pigment ink is preferably adjusted to be neutral or alkaline. With this configuration, the solubility of the water-soluble resin used as a pigment dispersion can be increased, and a color ink having even more excellent long-term storage can be obtained. In this case, however, the pigment ink may cause corrosion of the members used in the inkjet printing apparatus, and therefore the pH value is preferably 7 to 10.

A suitable aqueous liquid medium in the pigment ink is a solvent mixture of water and a water-soluble organic solvent. As the water, it is preferable to use ion exchange water (deionized water) rather than regular water containing various types of ions. The amount of the water-soluble organic solvent in the pigment ink is generally 3 to 50 wt % based on the total weight of the pigment ink, and more preferably 3 to 40 wt %. The amount of water used can be 10 to 90 wt % based on the total weight of the pigment ink, and preferably 30 to 80 wt %.

The pigment ink may contain, in addition to the above components, a surfactant, an antifoaming agent, a preservative and the like as appropriate in order to obtain a color ink having target property values where necessary. In particular, in order to cause the liquid component of the pigment ink to rapidly permeate into the print medium, it is necessary to add an appropriate amount of a surfactant that functions as a permeation enhancing agent. The amount can be, for example, 0.05 to 10 wt %, and preferably 0.5 to 5 wt %.

Even in the case where a clear ink is included, the present embodiment can be suitably used. The clear ink can be produced by combining the above-described materials, or in other words, by combining the materials excluding the pigment component. However, care should be given to solidification in the ink tank because reactivity is high, and efforts should be made to remove the influence of light and dry air temperature during storage in the tank.

Mask Pattern

Hereinafter, mask patterns stored in the memory 403 will be described. The mask pattern used herein is data that sets which of a plurality of passes to use to print binarized data. The following description will be presented in the context of multi-pass printing using six passes. A single set including six mask patterns, each pattern corresponding to each pass, will be referred to as a "pattern set". As will be described later, the pattern set is prepared for each type of print medium (or each predetermined gloss level).

Figure 6:
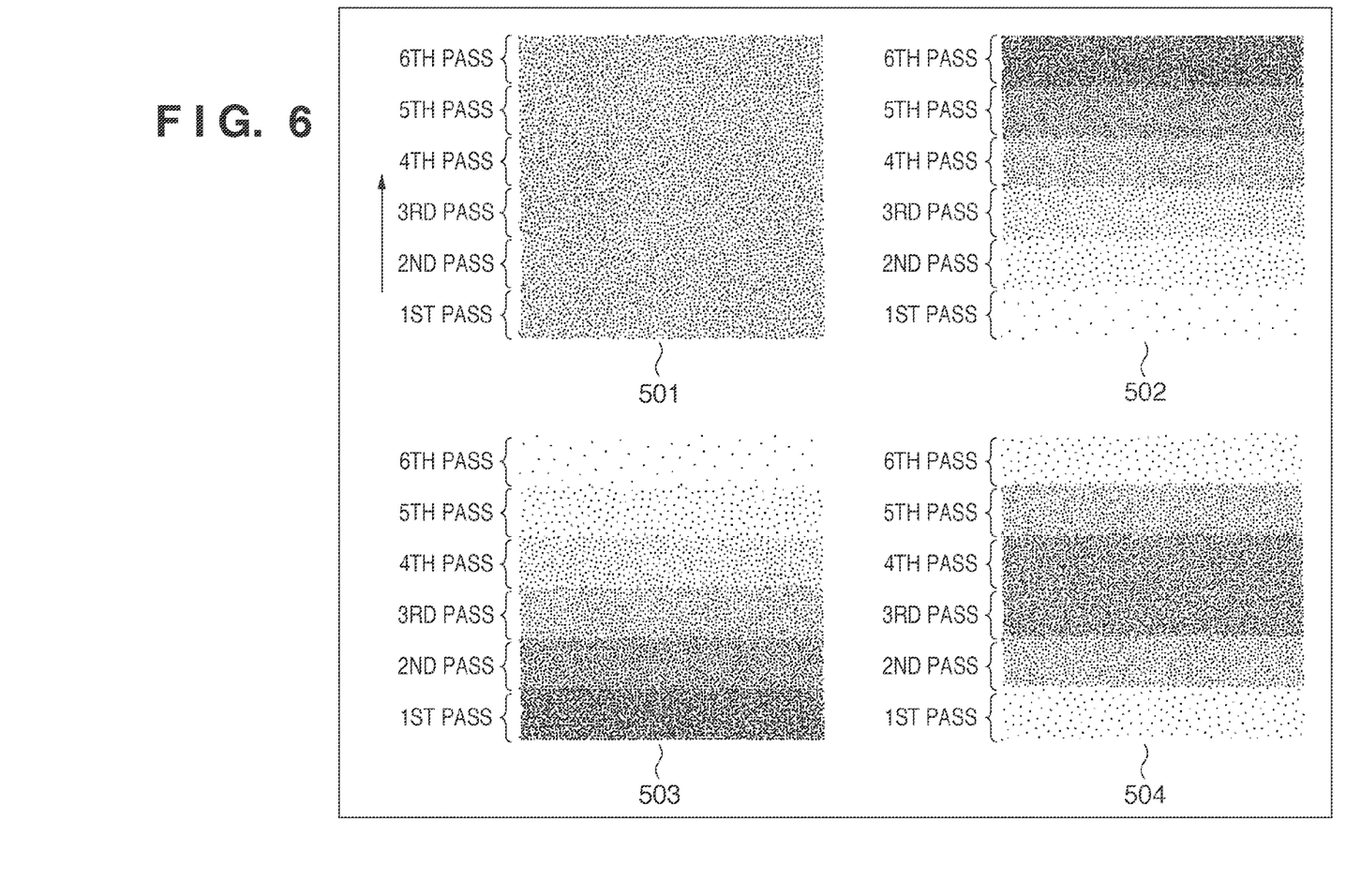
FIG. 6 shows a plurality of example pattern sets.

FIG. 6 shows example pattern sets. Here, four pattern sets 501 to 504 are shown. In the pattern sets 501 to 504, dark portions indicate printable (non-mask) pixels, and light portions indicate unprintable (mask) pixels. Areas obtained by dividing a pattern set lengthwise into six correspond to the mask patterns of the first to sixth passes from bottom to top. Here, the mask pattern for each pass is set such that the dark portions (non-mask pixels) of the passes add up to 100%. By performing an AND operation on binarized data converted from image data to be formed, dots to be printed in each pass are finally determined.

Figure 5:
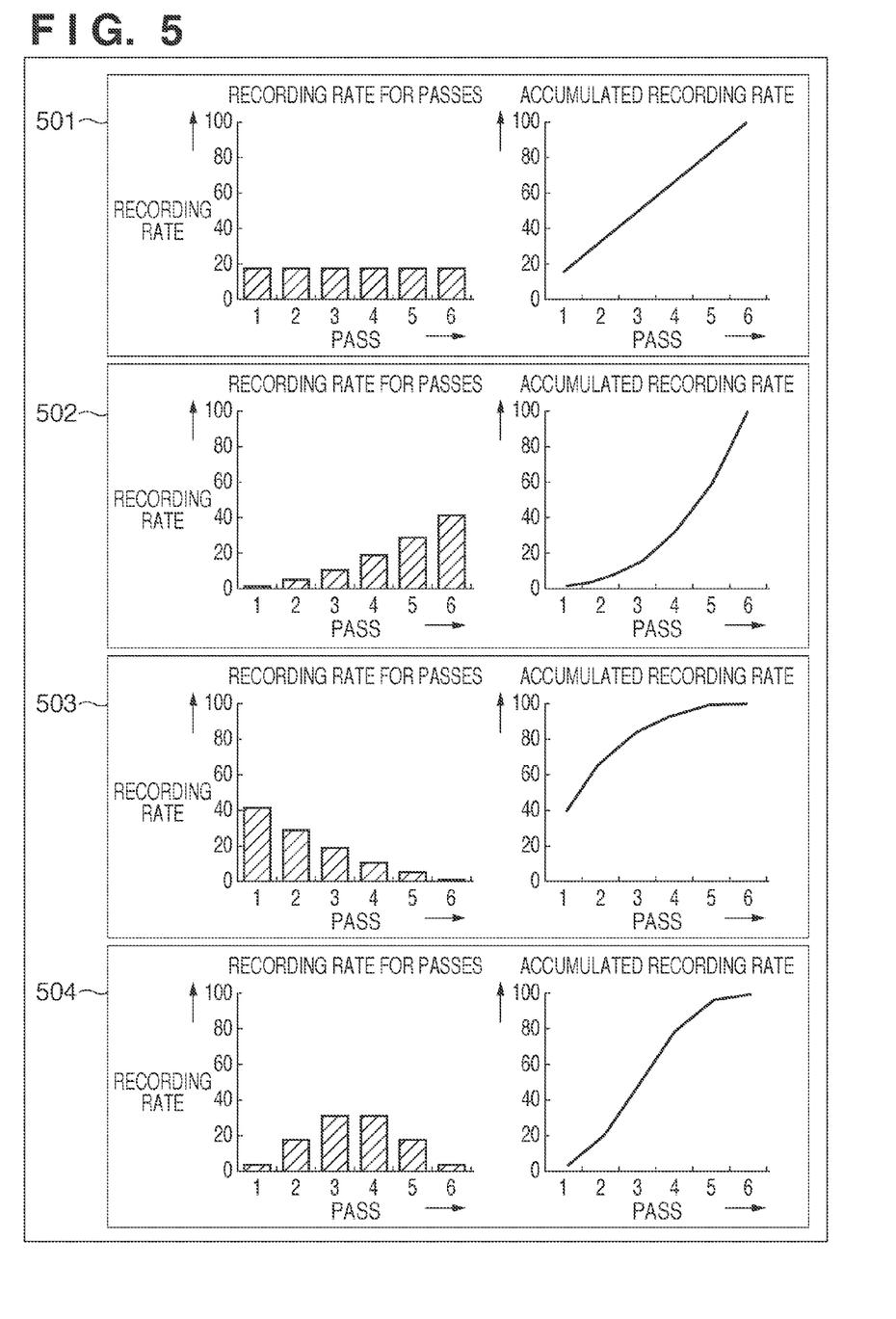
FIG. 5 is a diagram showing an example of the distribution of printing ratio for the passes of each of a plurality of pattern sets.

FIG. 5 shows the printing ratio and the accumulated printing ratio for the passes with respect to each of the four pattern sets 501 to 504. Because the mask pattern for each pass is set such that the dark portions (non-mask pixels) of the passes add up to 100% as described above, 100% is obtained when the printing ratio of each pass is added up.

As can be seen from FIGS. 5 and 6, the pattern set 501 is an example pattern set with a distribution in which the printing ratio is equal across the passes. The pattern set 502 is an example pattern set with a distribution in which the earlier the pass, the lower the printing ratio. The pattern set 503 is an example pattern set with a distribution in which the earlier the pass, the higher the printing ratio. The pattern set 504 is an example pattern set with a distribution in which middle passes have high printing ratios. As described above, the distribution of the printing ratio set over six mask patterns included in each of the four pattern sets is set differently for each pattern set.

Although FIG. 6 shows typical examples in which the non-mask pixels are exclusive between passes, the arrangement of the non-mask pixels is not limited thereto. For example, the non-mask pixels may overlap between passes. As for the size of the pass mask pattern, for example, a pass mask pattern of basic size such as 128 pixels×128 pixels can be prepared, and the pass mask pattern is repeatedly used in the vertical and horizontal directions of the image when actually printed.

Figure 7:
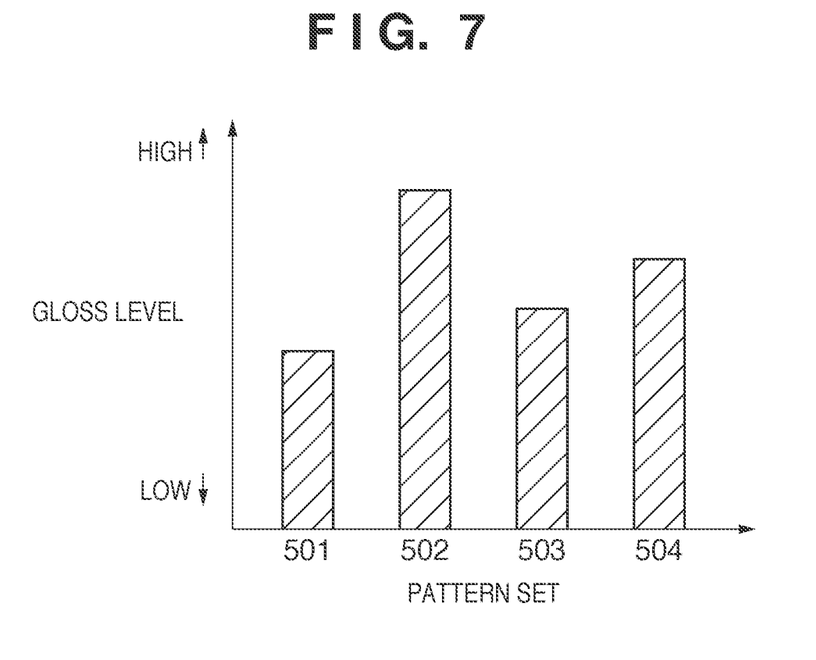
FIG. 7 is a diagram showing gloss level differences among a plurality of pattern sets when a solid image is printed using each pattern set.

FIG. 7 is a diagram showing differences in glossiness (gloss level) when solid images (100% duty images) are printed on a print medium using the four pattern sets 501 to 504. In this example, PIXUS Pro 9500 (available from Canon Co.) was used as the inkjet printing apparatus, and PGI-2PBk (photo black) (available from Canon Co.) was used as the ink.

As can be seen from FIG. 7, the highest gloss level was obtained when the pattern set 502 was used, and the lowest gloss level was obtained when the pattern set 501 was used. In this manner, the gloss level of an output image on the print medium can be changed by changing the distribution of the printing ratio over the passes. Based on the results of FIG. 7, gloss level information is associated with each of the pattern sets 501 to 504, and stored in the memory 403.

Figure 8:
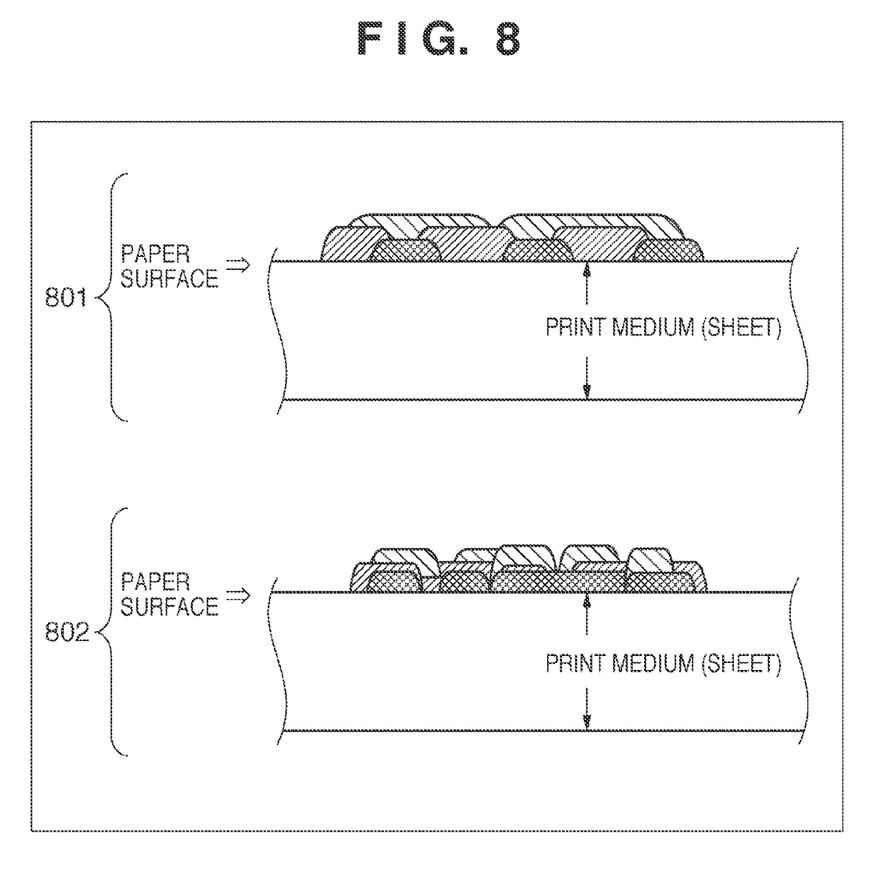
FIG. 8 shows an example of the difference in the accumulated state of ink between different pattern sets.

A difference in gloss level can be explained using the smoothness of the uppermost face of accumulated ink. FIG. 8 shows an example of the difference in the accumulated state of ink between different pattern sets. Reference numeral 801 indicates an accumulated state obtained when the pattern set 502 (in which the earlier the pass, the lower the printing ratio) was used, and 802 indicates an accumulated state obtained when the pattern set 501 (in which the printing ratio was equal across the passes) was used. In order to simplify the illustration, the diagram shows accumulated states in the case of three-pass printing. The lower the layer (closer to the paper surface), the earlier in the order of the pass the pigment was printed.

It can be seen from the accumulated state 801 that more dots are printed (in other words, more pigment accumulates) in the upper layer, and therefore the dots easily come into contact with each other and become bloated, forming a rather smooth surface layer. As a result, an image of high gloss level is formed. On the other hand, in the accumulated state 802, dots are printed evenly across the passes, and therefore the probability that dots come into contact with each other is low, and individual dots are accumulated in an isolated manner. Accordingly, a large number of irregularities are formed on the image surface, resulting in an image of low gloss level. In other words, it can be seen that the smoothness depending on accumulation of the pigment ink can be controlled by controlling the distribution of the printing ratio across the passes.

Operation of Apparatus

Figure 4:
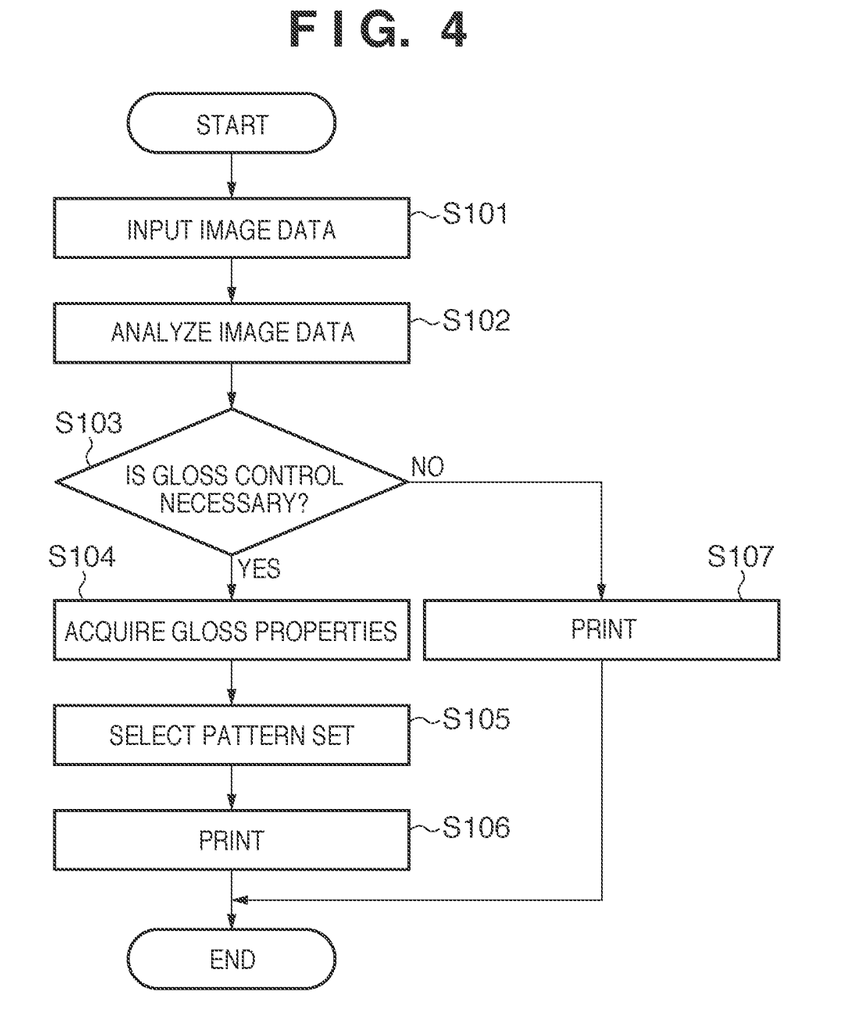
FIG. 4 is an operational flowchart of the inkjet printing apparatus according to the first embodiment.

FIG. 4 is an operational flowchart of the inkjet printing apparatus according to the first embodiment. The following operations are implemented by the CPU 402 executing the control program stored in the ROM of the memory 403.

In step S101, the CPU 402 receives image data (print data) to be formed from the host computer 2000. The image data includes image data itself as well as information regarding, for example, the type of print medium. The information regarding the type of print medium is specified by a printer driver user interface (UI) (not shown) (medium type setting unit).

In step S102, the CPU 402 analyzes the information of the received image data, and determines the type of print medium from among "glossy paper", "mat paper" and "regular paper".

In step S103, the CPU 402 determines whether or not it is necessary to control the glossiness of the image to be printed depending on the type of print medium determined in step S102. If, for example, it is determined in step S102 that the type of print medium is glossy paper, it is determined that it is necessary to perform gloss control, and the procedure advances to step S104. If, on the other hand, it is determined in step S102 that the type of print medium is mat paper or regular paper, it is determined that it is unnecessary to perform gloss control, and the procedure advances to step S107.

In step S104, the CPU 402 acquires information regarding gloss properties (target gloss level) for the image to be printed (accepting unit). The determination may be performed based on the information regarding the type of print medium included in the image data input in step S101, or may be performed based on a user instruction via a printer driver UI (not shown).

In step S105, one pattern set is selected from among four different types of pattern sets 501 to 504 stored in the memory 403 based on the target gloss level obtained in step S104. Specifically, a pattern set associated with the gloss level information indicating a gloss level that is closest to the target gloss level is selected. Steps S101 to S105 may be performed by a printer driver (not shown) of the host computer 2000.

In step S106, a recording pattern for each pass is generated based on the pattern set selected in step S105 (recording pattern generation unit), and the printhead 104 is caused to perform scanning motion in accordance with the generated recording pattern, and an image is sequentially printed per pass (print controlling unit). More specifically, each time the printhead is caused to perform scanning motion for printing, the print medium is sequentially conveyed in the sub-scanning direction by a width corresponding to one pass (in other words, the reciprocal (1/N) of the total number of passes having a width that can be printed with one scanning motion of the printing element array). On the other hand, in step S107, the existing print process in the case where the type of print medium is determined to be mat paper or regular paper is performed.

As described above, according to the first embodiment, the smoothness depending on accumulation of the pigment ink in multi-pass printing is controlled by controlling the distribution of the printing ratio across the passes during multi-pass printing, whereby in multi-pass printing, the smoothness can be controlled more suitably.

Variation

The first embodiment has been described in the context of multi-pass printing using six passes as an example, but the number of passes is not limited thereto. The embodiment is applicable to multi-pass printing in which printing is performed N times (where N is an integer of 2 or more). In this case, each pattern set includes N mask patterns corresponding to respective passes. In the above description, four different types of pattern sets were used, but it is possible to use M pattern sets (where M is an integer of 2 or more). In other words, the number of pattern sets can be determined as appropriate, taking into consideration user needs (the range and accuracy of gloss level to be adjusted), the amount of memory required to mount the pass masks, and the like. In the case where the printing ratio is changed significantly among the passes, the effect of multi-pass printing to improve the image quality (graininess and streaky background) tends to be low, and therefore it may be better to set the difference in printing ratio between passes to fall within a predetermined range.

Also, the above description was given in the context of monochrome printing using a photo black ink, but the embodiment is also applicable to color printing in which printing is performed using a plurality of inks. In this case, a configuration may be used in which a pattern set is selected for each printing element array that prints the corresponding color ink.

Furthermore, a method may be used in which an image area to be printed is divided into a plurality of areas and different pattern sets are assigned to the areas. For example, with respect to image data having areas having different print duties, a pattern set can be specified for each area such that desired gloss properties can be obtained individually. In this case, the gloss properties of images are obtained by printing tone patches, to which print densities have been assigned, using a plurality of pattern sets, and then pass mask pattern information with which desired properties can be printed when each tone is printed is obtained in advance.

The image data may be divided into areas such that the areas are arranged in a repeated manner in the main-scanning direction and the sub-scanning direction. The smaller the size of the divided area, the finer gloss control is possible, and the size of the divided area can be determined in relation to the balance between processing load and accuracy required. In the case of switching the pattern set, there is a possibility that the boundary portion between areas might become visually distinguishable, and therefore the boundary portion may be positioned at a position offset by a slight amount in the main-scanning direction and the sub-scanning direction.

Second Embodiment

Outline

According to a second embodiment, when a printing apparatus performs printing on glossy paper that is not supported by the standard driver, or when an influence resulting from individual differences in printing apparatuses, the environment or the like occurs, desired gloss properties can be obtained by selecting a more accurate and suitable printing method.

Apparatus Configuration

An inkjet printing apparatus 200 according to the second embodiment is obtained by adding a gloss sensor to the inkjet printing apparatus 100 (FIG. 2) of the first embodiment. The gloss sensor is included in the sensor/SW unit 407 shown in FIG. 2. The gloss sensor (gloss measuring unit) measures the gloss level of an image printed on a print medium and transfers information regarding the acquired gloss level to the CPU 402. Accordingly, it is suitable to attach the gloss sensor in the periphery of a paper discharge unit.

In the experiment conducted by the inventors, a photo-reflector KR640 (available from Shinko Denshi Co. Ltd.) was used as the gloss sensor, but any optical sensor can be used. Other than the photo-reflector KR640, for example, KR641, KR650, KR651 (all of which are available from Shinko Denshi Co. Ltd.) or the like can be used. Measurement may be performed using a combination of a light-emitting diode and a photodiode.

For example, when printing on a print medium, prior to printing of intended image data, a test pattern image is printed on the print medium based on a user instruction via a printer driver UI (not shown). At this time, a test pattern image is formed using each of four different types of pattern sets 501 to 504 stored in the memory 403. After that, the gloss level is measured using the gloss sensor, and a table is generated based on the gloss levels of the test pattern images of the pattern sets 501 to 504. Then, the intended image data is printed based on the generated table.

Situations may arise in which the measured values from the gloss sensor differ from the actual inspection by the user. Accordingly, a configuration may be employed in which a table correction is accepted from the user via a UI (not shown).

As described above, according to the second embodiment, the gloss levels of images that have been printed on the print medium are measured by the gloss sensor, and a table for use in selecting a pattern set is generated based on the obtained information, whereby the gloss level can be controlled more suitably in multi-pass printing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-131504, filed Jun. 8, 2010, which is hereby incorporated by reference herein in its entirety.

What is claimed is:

1. An information processing apparatus for an image forming apparatus that forms an image on the same area in a print medium by a plurality of printing scans with the same ink, the information processing apparatus comprising:
an input unit that receives inputs of image data and a target gloss level;
a storage unit that stores a plurality of pattern sets, each pattern set having a recording pattern corresponding to the printing scan, including at least a first pattern set in which a thinning ratio of the recording pattern corresponding to the printing scan becomes lower as the printing scans on the same area take place and a second pattern set in which a thinning ratio of the recording pattern corresponding to the printing scan becomes higher as the printing scans on the same area take place; and
a generation unit that generates a recording pattern for each of the printing scans to be formed on the recording medium using the first pattern set for an area in which the target gloss level is low in the image represented by the image data and using the second pattern set for an area in which the target gloss level is high in the image represented by the image data, wherein a number of the printing scans to the same area of the first pattern set and a number of the printing scans to the same area of the second pattern set are the same.

2. The information processing apparatus according to claim 1, further comprising:
   a gloss level information storage unit that stores gloss level information for each type of print medium, and
   a setting unit that sets the type of print medium on which the image is to be formed,
   wherein the input unit receives an input of a gloss level corresponding to the print medium set by the setting unit as the target gloss level.

3. The information processing apparatus according to claim 1, wherein the input unit receives, together with the image data, an input of gloss level information associated with the image data, and accepts the information as the target gloss level.

4. The information processing apparatus according to claim 1, further comprising:
   a gloss measuring unit that optically measures a gloss level of the image formed on the print medium,
   wherein the generation unit selects one pattern set from among the plurality of pattern sets based on the gloss level measured by the gloss measuring unit.

5. A computer-readable storage medium storing a computer program for causing a computer to function as units of the information processing apparatus according to claim 1.

6. A method for controlling an image forming apparatus that forms an image on the same area in a print medium by a plurality of printing scans with the same ink, the method comprising the steps of:
   receiving inputs of image data and a target gloss level;
   storing a plurality of pattern sets, each pattern set having a recording pattern corresponding to the printing scan, including at least a first pattern set in which a thinning ratio of the recording pattern corresponding to the printing scan becomes lower as the printing scans on the same area take place and a second pattern set in which a thinning ratio of the recording pattern corresponding to the printing scan becomes higher as the printing scans on the same area take place; and
   generating a recording pattern for each of the printing scans to be formed on the recording medium using the first pattern set for an area in which the target gloss level is low in the image represented by the image data and using the second pattern set for an area in which the target gloss level is high in the image represented by the image data,
   wherein a number of the printing scans to the same area of the first pattern set and a number of the printing scans to the same area of the second pattern set are the same.

* * * * *